Jan. 4, 1955 G. J. KOEHLER ET AL 2,698,731
FLUID VALVE
Filed June 29, 1949
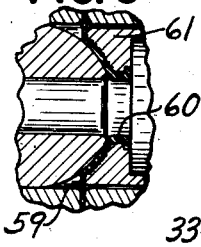
FIG. 8
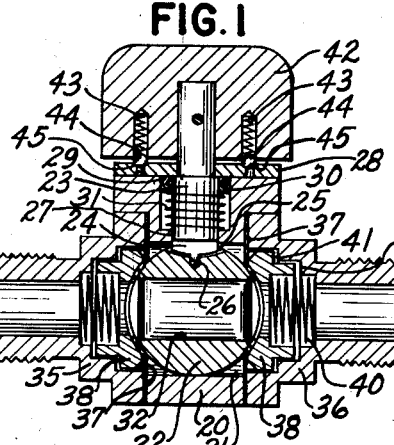
FIG. 1
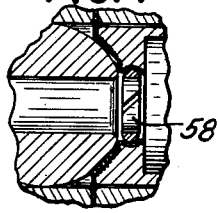
FIG. 7
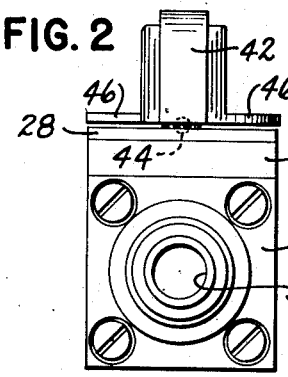
FIG. 2
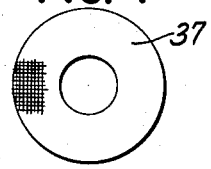
FIG. 3
FIG. 4
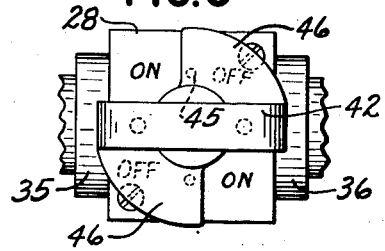
FIG. 6
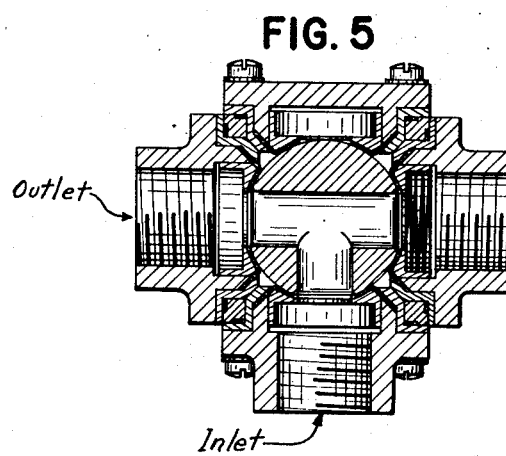
FIG. 5
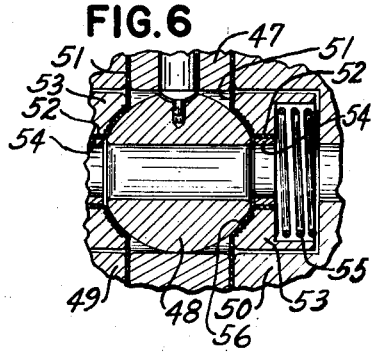
Inventors
GUSTAVE J. KOEHLER &
GORDON T. KOEHLER
By Richard Van Buseum
THEIR Attorney

United States Patent Office 2,698,731
Patented Jan. 4, 1955

2,698,731

FLUID VALVE

Gustave J. Koehler and Gordon T. Koehler,
Dayton, Ohio

Application June 29, 1949, Serial No. 102,088

5 Claims. (Cl. 251—172)

This invention relates to fluid control valves and is particularly directed to improved means for sealing the plug members of such valves against leakage.

One object of the present invention is to provide improved means for sealing the plug members of fluid valves.

Another object is to provide a compact fluid valve, having a plug member that is substantially free from friction and easy to operate, and to further provide sealing means for the plug member which is economical and easy to install and one that operates efficiently to prevent fluid leakage through the valve under extreme pressure conditions.

A further object is the provision of a valve for controlling the flow of fluid that is efficient, compact and economical to manufacture.

Still another object is to provide a novel fluid valve having a ball-type or spherical plug member which coacts with a spring-loaded seat element constructed of a comparatively thin sheet of impervious material.

Another object is to provide a fluid valve having a novel seat made of a thin sheet of impervious material which is maintained in yielding contact with the plug member of the valve.

With these and incidental objects in view, the invention includes certain novel features of construction and combinations of parts, a preferred form or embodiment of which is hereinafter described with reference to the drawing which accompanies and forms a part of this specification.

In the drawing:

Figure 1 is a cross sectional view of the valve of this invention.

Figure 2 is an end view of the valve.

Figure 3 is a fragmentary, top plan view of the valve of this invention.

Figure 4 is a detail view of the seat washer used in the valve.

Figure 5 is a sectional view showing a selector type of valve in which a somewhat different method of securing the seat washer therein is employed.

Figure 6 is a fragmentary sectional view of a modified form of valve.

Figures 7 and 8 are illustrations of variations of the valve shown in Figure 6.

Description

The valve of this invention comprises a body portion 20 (Figs. 1, 2, and 3) with a bore 21 which freely receives a rotatable ball-type valve member or plug 22. A stem 23 is provided for turning the valve member 22 and said stem has a flattened portion 24 on its lower end which engages a corresponding slot 25 in the member 22. A tongue 26, extending from the flattened portion, engages a hole in the bottom of the slot 25 and in cooperation with the flattened portion and the slot maintains the member 22 properly located in the bore 21.

The stem 23 is journaled in a bore 27 in the body 20 and in a hole in a cover plate 28 secured to the body 20 with suitable screws. A shoulder formed by the undercut upper end of the stem 23 cooperates with the plate 28 to maintain said stem in proper placement in the body 20.

The stem 23 is sealed against leakage by a plastic sealing washer 29 which closely engages said stem and is disposed in an enlarged or counterbored upper portion of the bore 27. A metal backing washer 30 and a spring 31 wedge the sealing washer between the stem and the wall of the counterbore and against the cover plate 28 to prevent leakage of fluid around the stem.

The valve member 22 has a through hole 32 and when the valve is open, said hole is arranged to register with corresponding axially aligned holes 33 and 34 in connectors 35 and 36 secured to opposite faces of the body 20 with suitable screws.

The connectors 35 and 36 have threaded portions for coupling them to suitable tubing or pipes for conducting fluid to and from the valve.

Comparatively thin and flexible seat washers 37 made of suitable fabric material impregnated with a suitable plastic material, such as synthetic rubber, are securely clamped between the faces of the connectors 35 and 36 and the corresponding adjacent faces of the body 20 and thus form fluid seals between said faces. When clamped between the corresponding opposed faces, the seat washers 37 overlie the periphery of the ball valve member 22 and said washers are maintained in yielding engagement with said periphery by corresponding cylindrical seat elements 38, which fit freely in corresponding counterbored portions 39 of the holes 33 and 34 in the connectors 35 and 36. The elements 38 have concave faces which match the contour of the ball member 22, and each of said elements is provided with a compressible spring 40 which yieldingly presses or impinges the corresponding washer 37 between said concave faces and the periphery of the ball 22, to form a leak-proof valve seat.

It will be noted that the ball 22 is yieldingly supported between the diametrically opposed seat washers 37 and their corresponding elements 38, the effect of which is to properly center the ball with relation to the stem 23 and the bore 21, thus to provide an easily operable valve that is practically free from friction yet is constructed so as to obtain superior leak-proof characteristics and thus adapt said valve for use in controlling the flow of highly volatile fluids under pressure.

The opposed seat washers and elements likewise better adapt the valve for use in installations where it is desired to control the flow of fluids in either of two directions.

It will be noted that clearance has been provided between the counterbores 39 and the corresponding seat elements 38 to permit the incoming fluid to flow therebetween and against the outer faces of the seat washers 38, as indicated at 41 (Fig. 1), to utilize the pressure of the fluid in maintaining said seat washers in contact with the periphery of the ball 22 to prevent leakage between said washer and said ball.

The stem 23 is rotated by means of a turning piece 42 (Fig. 1) secured on the upper end thereof, said piece having opposed holes that contain corresponding compressible springs 43 and ball-bearings 44. The springs urge the ball-bearings downwardly into yielding engagement with indentations 45 in the top surface of the plate 28, said indentations being located according to the open and closed positions of the valve, to retain said valve in said positions.

The turning piece 42 has similar segmental flanged portions 46 (Fig. 3) which alternately expose and conceal the words "On" and "Off" engraved in the plate 28, to indicate the "on" or "off" condition of the valve.

The valve shown in Fig. 5 is basically similar in construction to the valve shown in Figs. 1, 2, and 3 and described above with the exception that a somewhat different method of securing the seat washer in the valve body is employed. Likewise the valve of Fig. 5 is constructed as a selective distributing valve and may be employed to distribute fluid from an inlet port to either or both of two outlet ports, as required.

Fig. 6 illustrates a modified form of valve having a body portion 47, a ball member 48 and connectors 49 and 50 similar to the valve of Fig. 1. This valve differs from the valve of Fig. 1 in that it has a seat washer 51 with a central collar 52 which is retained in a bore in a seat element 53 by a retaining ring 54. The seat washer is preferably of fabric material impregnated with a plastic material such as synthetic rubber and the collar 52 is preferably, but not necessarily, molded to shape as an integral part of the washer. The ring 54 is of proper outside diameter to properly secure the collar 52 in the bore under all conditions of normal use of the valve.

The central hole in the seat washer 37 (Fig. 1) may have a tendency to fray or lap over under certain extreme conditions of operation and the construction of the seat washer 51 (Fig. 6) obviates such a tendency. A spring 55 causes a concave surface on the seat element 53 to engage and maintain the washer 51 in yielding engagement with the periphery of the ball 48. It will be noted that the concave surface of the seat element 53 has closely spaced annular serrations 56 which assist in preventing distortion and displacement of the seat washer 51 when the ball 48 is turned.

As in the construction shown in Fig. 1 and described above, clearance is provided between the outside circumference of the seat element 53 and the bore therefor in the connector 50, to permit the pressure of the incoming fluid to assist the spring 55 in maintaining leak-proof contact between the washer 51 and the ball 48.

The valve of Fig. 6 has a left-hand seat washer, seat element, retaining ring and spring similar in every respect to the corresponding right-hand parts described above.

Fig. 7 illustrates a fragmentary portion of a valve similar in most respects to the valve shown in Fig. 6, the main difference being that in place of the retaining ring 54, a split or open spring retaining ring 58 is provided, and said ring has a rounded outer surface which yieldingly forces the collar of the seat washer into a matching annular groove in the seat element.

Fig. 8 illustrates a fragmentary portion of a valve similar to the valves shown in Figs. 6 and 7, but having a seat washer 59 with a molded collar 60 which fits in a bore and a counterbore in a seat element 61.

It is to be understood that in certain adaptations the ball-type valve member may be replaced with a cylindrical-type valve member for use in a multi-port distributing valve, for example, said valve employing the same thin, flexible seat washers and the same method of retaining said washers in resilient contact with the periphery of the cylindrical member as described above, without departing from the spirit and scope of this invention.

Likewise the invention is of such a nature as to permit its embodiment in various other forms, than those disclosed herein.

What is claimed is:

1. In a fluid valve having a body portion with a bore therein, the combination of a ball-type valve member rotatable in the bore and having a fluid passage therethrough; diametrically opposed connectors secured to the opposite faces of the body portion and having axially aligned fluid passages therethrough which match with the passage in the ball-type member when the valve is open; a comparatively thin flexible seat washer of uniform thickness secured near its outer peripheral edge between each of the connectors and the body portion, the holes in said washers being in register with the fluid passages in said connectors; spring-loaded seat elements freely mounted in the fluid passages in each of the connectors and having inwardly facing concave surfaces which match the contour of the ball-type member and which operate to maintain the portion of the washers surrounding the holes therein in yielding contact with the periphery of said ball-type member, to form a fluid seal between said member and the fluid passages; and means to rotate the ball-type member to open and close the valve, said rotating means also operating to maintain said ball-type member properly located in the valve body.

2. In a fluid valve having a body portion with a bore therein, the combination of a ball valve member rotatable in the bore, said member having a fluid passage therethrough; a connector secured to the body portion and having a fluid passage therethrough which is in register with the fluid passage in the ball when the valve is open, said connector having a counterbore in axial alinement with the fluid passage; a seat element mounted in the counterbore, and having a central bore in register with the fluid passage; a seat washer made of thin flexible material and having a central collar formed thereon which fits in the central bore in the element, the outer edge of said washer being clamped between the connector and the body portion; means to retain the collar in the central bore in the seat element; and spring means coacting with the seat element to maintain the seat washer in firm yielding contact with the periphery of the ball member to form a fluid seal between said ball member and the fluid passage.

3. In a fluid valve having a body portion with a bore therein, the combination of a ball-type valve member with a fluid passage therethrough said member fitting freely in the bore; connectors secured to opposite faces of the body portion and having aligned fluid passage therethrough which register with the passage in the ball member when the valve is open, said connectors having inwardly facing counterbores which are in axial alinement with the fluid passages therethrough; a seat element loosely supported in each counterbore, said elements each having a central bore and an inwardly facing concave face which matches the periphery of the ball member; a thin flexible seat washer for each seat element, said washers each having a central collar portion which fits in the bore in the corresponding seat element, and each having an enlarged circular portion surrounding the collar and extending between the concave face and the periphery of the member, the outer edge of said circular portion being clamped between the corresponding connector and the body portion; means to retain the collar in the bore; a spring for each of the elements and acting to force said elements inwardly to cause the concave faces to force the seat washers into firm yielding engagement with the periphery of the ball member to form a fluid seal between said ball member and the fluid passages; and means to turn the ball member to open and close the valve, said means also acting to maintain said ball member properly located with respect to the fluid passages.

4. In a fluid valve having a body portion with a bore therein, the combination of a ball-type valve member rotatably mounted in the bore and having a fluid passage therethrough; a connector secured to the body portion opposite the bore and having a fluid passage therethrough comprising a central bore and a corresponding counterbore, which register with the fluid passage in the member when the valve is open; a cylindrical bushing-like seat element freely mounted in the counterbore and having an inwardly disposed concave surface which conforms to the periphery of the member; a seat washer made of thin flexible sheet material of uniform thickness, said washer extending between the concave surface and the periphery of the member so that the hole therein is in alinement with the fluid passages, said washer being clamped at its outer peripheral edge between the connector and the body portion; and a spring compressed between the seat element and the bottom of the counterbore to maintain the portion of the seat washer extending between the concave surface and the member in yielding contact with the periphery of said member, which, in cooperation with the pressure of the incoming fluid against said seat element and said seat washer, forms an effective fluid seal.

5. In a fluid valve having a body portion with a bore therein, the combination of a ball valve member rotatably mounted in the bore and having a fluid passage therethrough; a connector secured to the body portion and having a fluid passage therethrough which registers with the passage in the ball member when the valve is open; a cylindrical seat element freely mounted in the fluid passage in the connector and having a central bore which is in alinement with the fluid passages in said connector and said member; a seat washer made of thin flexible material of uniform thickness, said washer extending between the seat element and the ball valve member and being clamped at its outer peripheral edge between the connector and the body portion, said washer having a central collar formed thereon which fits in the bore in said seat element; a ring to clamp the collar in the bore; and spring means coacting with the seat element to cause said element to maintain the portion of the washer extending between said element and the ball valve member in yieldable contact with the periphery of said member to form an effective fluid seal between said member and the fluid passages.

References Cited in the file of this patent

UNITED STATES PATENTS

| Number | Name | Date |
| --- | --- | --- |
| 1,670,691 | Riggin | May 22, 1928 |
| 1,770,900 | Dawson | July 22, 1930 |
| 2,297,161 | Newton | Sept. 29, 1942 |
| 2,404,816 | Snyder | July 30, 1946 |
| 2,471,941 | Downey | May 31, 1949 |
| 2,520,288 | Shand et al. | Aug. 29, 1950 |
| 2,605,994 | Borchardt | Aug. 5, 1952 |